US008021468B2

(12) United States Patent
Murphy et al.

(10) Patent No.: US 8,021,468 B2
(45) Date of Patent: Sep. 20, 2011

(54) ROOM TEMPERATURE CHEMICAL TRAP FOR THE PURIFICATION OF GASEOUS METHANE

(75) Inventors: Nicie C. Murphy, Knoxville, TN (US); Todd L. Graves, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 436 days.

(21) Appl. No.: 12/144,006

(22) Filed: Jun. 23, 2008

(65) Prior Publication Data

US 2009/0314158 A1   Dec. 24, 2009

(51) Int. Cl.
*B01D 53/02* (2006.01)

(52) U.S. Cl. .............. 96/103; 96/106; 96/131; 96/134; 95/26; 95/87; 95/148

(58) Field of Classification Search .............. 95/26, 87, 95/148; 96/103, 106, 131, 136, 134
See application file for complete search history.

(56) References Cited

U.S. PATENT DOCUMENTS

| | | | | |
|---|---|---|---|---|
| 2,398,817 A * | 4/1946 | Turner | ............................... | 95/87 |
| 2,600,158 A * | 6/1952 | Clothier | ........................ | 436/139 |
| 3,049,909 A * | 8/1962 | Thomas | ........................ | 73/23.35 |
| 3,053,077 A * | 9/1962 | Tracht | ........................ | 73/23.22 |
| 3,168,823 A * | 2/1965 | Reinecke et al. | ............ | 73/23.26 |
| 3,338,062 A * | 8/1967 | Kogel | ............................... | 62/141 |
| 3,366,149 A * | 1/1968 | Taft et al. | ........................ | 141/82 |
| 3,374,607 A * | 3/1968 | Fisher et al. | ........................ | 95/87 |
| 3,490,202 A * | 1/1970 | Ayers | ........................ | 95/87 |
| 3,550,429 A * | 12/1970 | MacMurtrie et al. | ........ | 73/23.25 |
| 3,581,465 A * | 6/1971 | Haruki et al. | ........................ | 95/87 |
| 4,204,423 A * | 5/1980 | Jordan | ........................ | 73/23.25 |
| 4,261,709 A * | 4/1981 | Itoga et al. | ........................ | 95/141 |
| 4,553,985 A * | 11/1985 | Dahlgren et al. | ........................ | 95/26 |
| 4,805,441 A * | 2/1989 | Sides et al. | ........................ | 73/23.25 |
| 5,075,084 A * | 12/1991 | Wilhelm et al. | ........................ | 95/131 |
| 5,256,173 A * | 10/1993 | Rastelli | ........................ | 95/141 |
| 6,029,498 A * | 2/2000 | Walters et al. | ........................ | 73/23.39 |
| 6,354,136 B1 * | 3/2002 | Bremer et al. | ........................ | 73/23.35 |
| 7,260,978 B2 * | 8/2007 | Miyagawa | ........................ | 73/23.37 |
| 7,306,656 B2 * | 12/2007 | Lange et al. | ........................ | 96/101 |
| 7,368,000 B2 * | 5/2008 | Jain et al. | ........................ | 95/82 |
| 2006/0130649 A1 * | 6/2006 | Jain et al. | ........................ | 95/82 |

* cited by examiner

*Primary Examiner* — Duane Smith
*Assistant Examiner* — Christopher P Jones
(74) *Attorney, Agent, or Firm* — Peter L. Kendall

(57) ABSTRACT

A room temperature trap for the purification and concentration of gaseous methane. The trap utilizes the adsorption and desorption properties of microporous spherical carbon molecular sieves to purify and concentrate radiolabelled methane for application in an automated synthesis module without the need for cryogenic cooling.

18 Claims, 2 Drawing Sheets

ROOM TEMPERATURE CHEMICAL TRAP FOR THE PURIFICATION OF GASEOUS METHANE

FIELD

An aspect of the present invention relates to the purification and concentration of gaseous methane, especially in the production of $^{11}CH_3I$.

BACKGROUND

Positron emission tomography (PET) is a nuclear medicine imaging technique which produces a three-dimensional image or map of functional processes in the body. The system detects pairs of gamma rays emitted indirectly by a positron-emitting radioisotope (a PET tracer), which is introduced into the body on a biologically active molecule. Radiolabelled methyl iodide ($^{11}CH_3I$) and radiolabelled methane ($^{11}CH_4$) are used in the production of PET tracers. Automated chemistry modules designed to prepare such PET tracers, have been extremely valuable in clinical research and medicinal practices due to their ability to provide these PET tracers efficiently and quickly.

The production of $^{11}CH_3I$, typically involves two steps. First, hydrogen is reacted with radiolabelled carbon dioxide ($^{11}CO_2$) over a nickel catalyst to produce $^{11}CH_4$. Second, the $^{11}CH_4$ is reacted with gaseous iodine to produce $^{11}CH_3I$. The first step in the production of $^{11}CH_3I$ causes at least two problems.

First, water, oxygen, and nitrogen are byproducts and contaminants of the first step. These components are pollutants in the second step. Fortunately, water, oxygen, and nitrogen can be removed with common trap materials such as a supported sodium hydroxide material (for example, Ascarite™ sold by Aldrich Chemical Company) and/or phosphorus pentoxide ($P_2O_5$).

A second problem caused by the first step in the production of $^{11}CH_3I$, i.e., the reaction of hydrogen with radiolabelled carbon dioxide, is more serious. Hydrogen, a necessary reactant in the first step, becomes a contaminant in the second step. Hydrogen competes with the desired reaction in the second step by reacting with gaseous iodine. A down stream product of hydrogen and iodine also damages downstream equipment, unless it is removed. Room temperature trap materials such as those employed to remove water, oxygen, and nitrogen are not available to separate hydrogen from the product stream in the automated production of $^{11}CH_3I$.

DESCRIPTION OF THE RELATED ART

Cryogenic liquid cooled traps designed to take advantage of the boiling point difference between hydrogen and methane have been employed to separate hydrogen from the product stream in the automated production of $^{11}CH_3I$. Cryogenic liquid cooled traps utilize a porous polymeric sorbent trap as a surface medium for the methane to position itself while being immersed in a reservoir filled with liquid nitrogen. The liquid nitrogen is typically provided at a temperature of −195° C. Methane has a melting point of −182.5° C. Hydrogen has a boiling point of −252° C. When immersed into the liquid nitrogen reservoir, the methane freezes and is immobilized. Due to its lower boiling point, the hydrogen does not freeze and is not immobilized. Thus, while the methane is immobilized, the hydrogen can be purged from the system. Other gases and unwanted components, with boiling points lower than the melting point of methane, can also be purged.

Cryogenic liquid cooled traps involve many serious disadvantages, which are not admitted to have been known in the art by inclusion in this section.

(1) Initial and/or repeated cooling of these traps produces large volumes of effluent gas, which can cause regulatory concerns.
(2) Cryogenic fluids pose health risks to personnel.
(3) Personnel must be trained to handle cryogenic fluids.
(4) The cryogenic cooling step is cumbersome and time-consuming, because the step involves "hands-on" examination and servicing at frequent, regular intervals.
(5) Due to the nature of cryogenic fluids (for example, liquid nitrogen) at atmospheric temperature and pressure, and by the warmth of the room temperature trap immersed in the bath, the nitrogen quickly evaporates from the reservoir making refills necessary in order to proceed with subsequent steps in the synthetic plan.
(6) Due to the need to constantly refill the cryogenic liquid cooled traps, an inventory of the hazardous cryogenic fluids must be maintained.
(7) The amount of time a trap can remain at operating temperature is limited by the inventory of liquid nitrogen or other coolant.
(8) If the cryogenic liquid cooled trap is refilled manually the risk to personnel is increased. If the cryogenic liquid cooled trap is refilled automatically, expensive equipment is required. Either way, process efficiency is reduced.
(9) Manually refilling the cryogenic liquid cooled trap is of particular concern when dealing with radiolabelled compounds, because residual radioactive species around the trap can create significant radiation fields. These fields increase the time between radiosynthesis.
(10) Handling systems for cryogenic liquids are bulky and expensive.

In light of these disadvantages, there is a serious and growing need for a better way to separate hydrogen from the product stream in the production of $^{11}CH_3I$.

SUMMARY

An embodiment of the present invention is directed to an apparatus and method for the purification and concentration of gaseous methane that eliminates the above-mentioned disadvantages.

Another embodiment of the present invention is an apparatus for purifying a gaseous stream. The gaseous stream comprises methane. The apparatus comprises a column, and a heating mantle positioned so as to enable heat transfer from the heating mantle to the column. The column is packed with an adsorbent material. In another version of the invention, the apparatus further comprises a programmable computer controller, programmed to activate the heating mantle at a timed interval to achieve controlled release of the gaseous methane. In a preferred version of the invention, the heating mantle heats the column to from 100 to 300° C. More preferably, the heating mantle heats the column to about 200° C.

A further embodiment of the present invention is a method for purifying a gaseous stream. The gaseous stream comprises methane. The method comprises passing the gaseous stream through a column. The column is packed with an adsorbent material. The method further comprises maintaining the column at an adsorption temperature, wherein the adsorption temperature is a temperature at which an amount of methane is retained in the column. Finally, the method comprises subsequently heating the column to a desorption temperature, wherein the desorption temperature is a temperature at which the retained methane is released from the column. Preferably, the gaseous stream further comprises hydrogen. Preferably, the column is heated at a timed interval to achieve controlled release of the gaseous methane. Preferably the adsorption temperature is ambient air temperature. More preferably, the adsorption temperature is a temperature of 20° C. or above. Preferably, the desorption temperature is from 100 to 300° C. More preferably the desorption temperature is about 200° C.

In preferred embodiments of the invention, the adsorbent material comprises carbon. In other preferred versions of the invention, the adsorbent material comprises a porous polymer. In particularly preferred versions of the invention, the adsorbent material comprises a carbon molecular sieve. Preferably the carbon molecular sieve is microporous. Particularly preferably the carbon molecular sieve has a surface area of 1,200 m$^2$/g or more. It is also particularly preferred that the carbon molecular sieve is highly spherical.

In preferred embodiments of the invention, the adsorbent material is selected from the group consisting of styrene divinyl benzene polymers, ethyl vinyl benzene polymers, ethyl divinyl benzene polymers, vinyl pyrrolidone polymers, and vinyl pyridine polymers. More preferably, the adsorbent material has a surface area ranging from 300 m$^2$/g to 700 m$^2$/g.

In preferred embodiments of the invention, the column has a length of from 1 to 25 feet. More preferably, the column has a length of 5 feet or less. In preferred versions of the invention, the column is coiled. In other preferred versions of the invention, the column is wound around the heating mantle.

BRIEF DESCRIPTION OF THE DRAWINGS

These and other features, aspects, and advantages of exemplary embodiments of the invention will become better understood with reference to the following description and appended claims, and accompanying drawings where:

DETAILED DESCRIPTION

Figure 1:
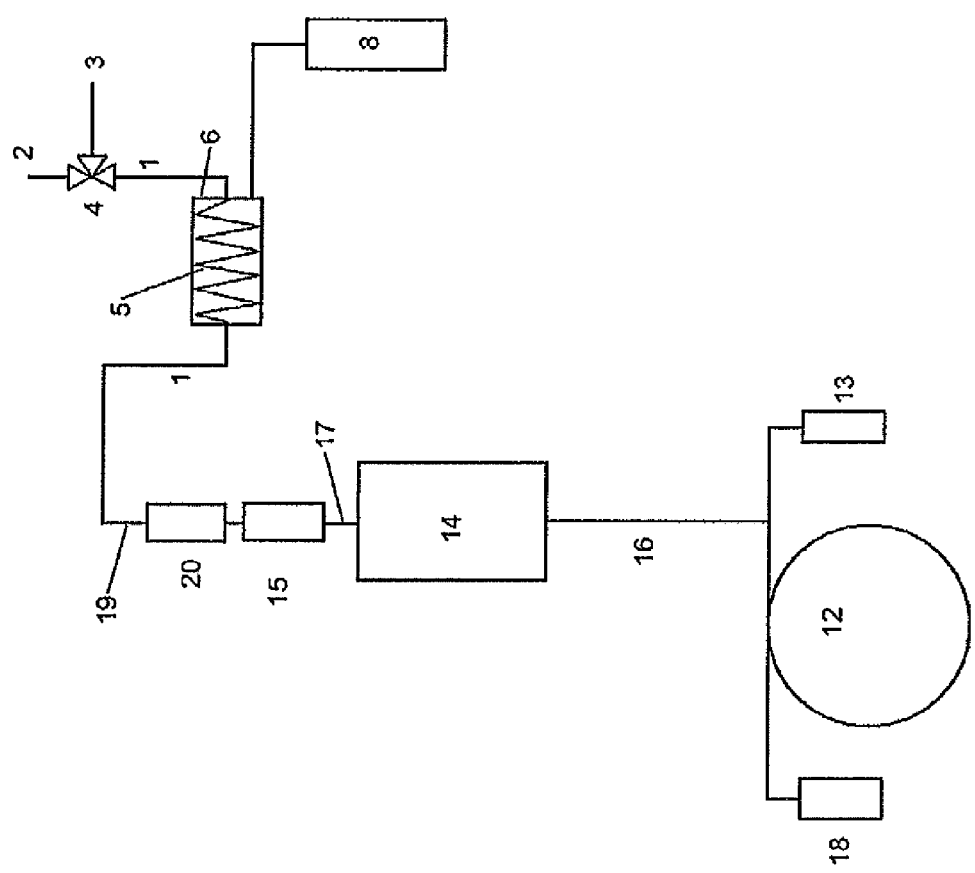
FIG. 1: shows a process flow employing a chemical trap according to an embodiment of the present invention.

A process employing a chemical trap, according to the present invention is illustrated in FIG. 1. The process comprises a particle accelerator (12) which produces gaseous $^{11}CO_2$ in the presence of nitrogen, oxygen, and a "push gas" comprising helium. The push gas is supplied to the particle accelerator (12) from a push gas supply tank (18).

The gaseous $^{11}CO_2$, produced by the particle accelerator, along with the nitrogen, the oxygen, and the helium "push gas" are combined with hydrogen from a hydrogen supply tank (13).

This gaseous stream, comprising $^{11}CO_2$, nitrogen, oxygen, helium push gas, and hydrogen, is delivered to a methane oven (14) through a transfer line (16). The methane oven is packed with a nickel catalyst and operated at 400° C. Passing the gaseous stream through the methane oven produces the desired intermediate-product, $^{11}CH_4$. At point (17), however, the $^{11}CH_4$ is present with oxygen, hydrogen, water, some nitrogen/oxygen byproducts, helium, and unreacted $^{11}CO_2$.

One or more process filters are employed to separate the unwanted gases from the $^{11}CH_4$. In the process illustrated in FIG. 1, a first process filter (15), comprising Ascarite™, and a second process filter (20), comprising $P_2O_5$, are employed. At point (19), after passing through the one or more process filters, the gas stream comprises $^{11}CH_4$, helium push gas, and hydrogen. This gas stream is transferred by an input line (1) through a heating mantle (6) to a chemical trap (5).

Chemical trap (5) comprises a column packing. Carbon, porous polymers, and other adsorbents can be used as column packing. The selection of the correct adsorbent material for the analyte of interest is fundamental to being able to successfully eliminate the need for sub-ambient temperatures in this thermal desorption method. The choice of sorbent depends upon several factors such as the molecular size, molecular area, and volatility of the analyte. Generally, the more volatile the analyte to be trapped, the stronger the adsorbent must be for effective separation. Adsorbents themselves are categorized according to size, shape, porosity, surface chemistry and surface area. The sorbent must be able to quantitatively retain the analytes of interest and then be able to release the analyte when sufficient heat is applied.

Methane has a boiling point of −161° C., similar to that of the permanent gases such as oxygen (−183° C.), carbon monoxide (−192° C.), nitrogen (−195° C.) and hydrogen (−252° C.). In order to effectively retain small, ultra volatile gases such as these, a medium with high surface area and small pore size must be utilized.

In preferred embodiments of the present invention, the column packing comprises carbon molecular sieves. Preferably, the carbon molecular sieves are microporous, which makes them an ideal medium for separating permanent gases and light hydrocarbons such as methane. Generally, the carbon molecular sieves have surface areas greater than 1,000 m$^2$/g, preferably greater than 1,200 m$^2$/g, and particularly preferably greater than 1,400 m$^2$/g. According to other preferred versions of the present invention, the carbon molecular sieves are highly spherical.

Other sorbents can also be used as column packing, such as those in the Porapak™ family (a family of styrene divinyl benzene polymers, ethyl vinyl and divinyl benzene polymers, vinyl pyrrolidone polymers and vinyl pyridine polymers) have smaller surface areas ranging from 300 m$^2$/g to 700 m$^2$/g.

Preferably, the column packing is selected from the following commercial brands: Carboxen™, Carbosphere™, Carbosieve™, Carbotrap™, Tenax™, Chromosorb™, UniCarb™, or Spherocarb™ carbon molecular sieves. These commercially available carbon molecular sieves preferably have the above-described surface area in order to ensure the separation of the gases.

The column packing of chemical trap (5) effectively "holds back" or hinders the flow of the $^{11}CH_4$, while the other gaseous components of the stream, typically only hydrogen and the helium push gas, pass through the chemical trap (5) quickly through line (1) to valve (4) and out through a waste line (3). The use of this particular medium for retaining methane eliminates the need for cryogenic cooling.

Desorption of the methane is achieved by the heating of the sorbent material above room temperature to the desorption temperature. More specifically, after the helium push gas has pushed all of the hydrogen out of the waste line (3), a heating mantle (6) is set to from 100° C. to 300° C., preferably to 200° C. and the purified and concentrated $^{11}CH_4$ gas is routed via line (1) through valve (4) to product line (2) for further processing to a desired end-product, for example, to $^{11}CH_3I$. In a preferred version of the invention, controlled release of the methane is accomplished by applying heat to the column at a timed interval to release all of the gaseous methane at once.

Prior to the start of the next chemical synthesis, the chemical trap (5) is cooled to 45° C. or less, preferably to 35° C. or less, particularly preferably to 25° C. or less. Cooling can be effected by simply allowing the chemical trap (5) to cool in ambient air, or preferably by passing compressed air from supply (8) around the chemical trap (5).

Figure 2:
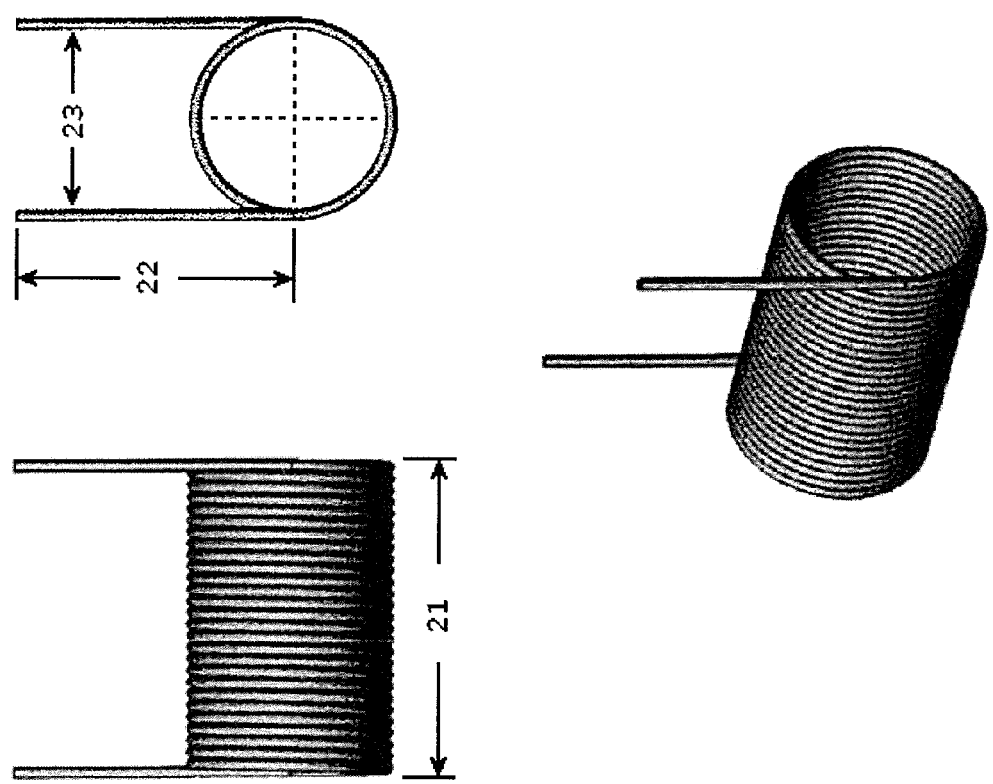
FIG. 2: shows several views of a chemical trap comprising a coiled column filled with carbon molecular sieves.

In a particularly preferred embodiment of the invention, the chemical trap comprises a coiled column filled with the carbon molecular sieves, described above. One example of such a chemical trap is illustrated in FIG. 2. According to this embodiment of the invention, it is preferable for the column to be wound tightly around a heating mantle in order for heat to be easily applied for desorption. The column has a length 21, a height 22, and a diameter 23. The methane is routed to the column after synthesis and its flow through the column is "held up" or hindered within the small pores of the sieves until the "desorption temperature" is reached, or until the distance of the column is traveled by the methane molecules.

The efficiency of the column increases proportionately to its length. Separations involving permanent gases require longer columns, because the difference between the boiling points of the gases is very small. Column lengths can vary based on the concentration and flow of purging gases and on how quickly the methane is desired to be released, with the maximum length being 25 feet of tightly coiled column. Exemplary embodiments of the present invention, directed to the separation of hydrogen from the product stream in the automated production of $^{11}CH_3I$, employ a column having a length of from 1-25 feet, preferably from 1 to 15 feet, more preferably from 1 to 10 feet, particularly preferably from 1 to 5 feet can be utilized. These small column lengths can be utilized because hydrogen's small molecular size, relative to the pore size of the column packing, causes it to proceed through the column quickly.

EXAMPLES

Several chemical traps, each comprising a gas chromatography column filled with Carboxen 1000, Sigma-Aldrich, 60/80 mesh, were tested. The columns varied in length from 5 feet to 15 feet. Each column was made of stainless steel. Each column had an inert material such as quartz wool or wire mesh at both ends of the column. The inert material ensured that the carbon sieve packing remained protected throughout use.

Methane was introduced directly onto each column via streams of inert gas. The methane remained in the column for a suitable length of time to perform all steps in the automated process. Subsequently the column was heated to 200° C. as quickly as possible, which caused the methane to be released from the column. No tangible loss of product was observed during the experiments, as compared to previous methods of methane trapping. The carbon molecular sieves successfully provided pure and concentrated methane streams upon desorption.

The previously described embodiments of the present invention have many advantages, including:
(1) elimination of the need for liquid nitrogen to retain methane for synthesis purification;
(2) ability to conduct the process at room temperature (based on the chemical and physical properties of the sorbent);
(3) ability to remove methane from the column by simple heating;
(4) automation of the process; and
(5) alleviation of serious risks to personnel arising from handling cryogenic materials.

Although the disclosure has been described in considerable detail with reference to certain preferred embodiments thereof, other embodiments are possible. Therefore, the spirit and scope of the appended claims should not be limited to the description of the preferred embodiments contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic seris of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. An apparatus for purifying a gaseous stream comprising methane, the apparatus comprising a particle accelerator that produces gaseous $^{11}CO_2$ in the presence of nitrogen, oxygen and a push gas; a hydrogen supply tank configured to combine hydrogen with the gaseous $^{11}CO_2$ the nitrogen and the push gas; a methane oven, wherein $^{11}CH_4$ is produced in the methane oven and is present as part of a gaseous stream with oxygen, hydrogen, water, byproducts, push gas and unreacted $^{11}CO_2$; a first process filter through which the gaseous stream is passed; a column having a length of 5 feet or less through which the gaseous stream is passed after the first process filter; a valve mechanism coupled to the column and capable of routing said gaseous stream to a product line in a first state and to a waste line in a second state; and a heating mantle positioned to enable heat transfer from the heating mantle to the column, wherein the column is packed with an adsorbent material.

2. An apparatus according to claim 1, further comprising a programmable computer controller, programmed to activate the heating mantle at a timed interval to achieve controlled release of the methane.

3. An apparatus according to claim 1, wherein the heating mantle heats the column to from 100 to 300° C.

4. An apparatus according to claim 1, wherein the heating mantle heats the column to about 200° C.

5. An apparatus according to claim 1, wherein the adsorbent material comprises carbon.

6. An apparatus according to claim 1, wherein the adsorbent material comprises a porous polymer.

7. An apparatus according to claim 1, wherein the adsorbent material comprises a carbon molecular sieve.

8. An apparatus according to claim 7, wherein the carbon molecular sieve is microporous.

9. An apparatus according to claim 7, wherein the carbon molecular sieve has a surface area of 1,200 m$^2$/g or more.

10. An apparatus according to claim 7, wherein the carbon molecular sieve is spherical.

11. An apparatus according to claim 1, wherein the adsorbent material is selected from the group consisting of styrene divinyl benzene polymers, ethyl vinyl benzene polymers, ethyl divinyl benzene polymers, vinyl pyrrolidone polymers, and vinyl pyridine polymers.

12. An apparatus according to claim 11, wherein the adsorbent material has a surface area ranging from 300 m$^2$/g to 700 m$^2$/g.

13. An apparatus according to claim 1, wherein the column is coiled.

14. An apparatus according to claim 13, wherein the column is wound around the heating mantle.

15. An apparatus according to claim 1, wherein the first process filter includes sodium hydroxide-coated silica.

16. An apparatus according to claim 1, further comprising a second process filter through which the gaseous stream is passed after passing through the first process filter and before passing through the column.

17. An apparatus according to claim 16, wherein the second process filter includes $P_2O_5$.

18. An apparatus according to claim 17, wherein the first process filter includes sodium hydroxide-coated silica.

* * * * *